Patented Aug. 11, 1925.

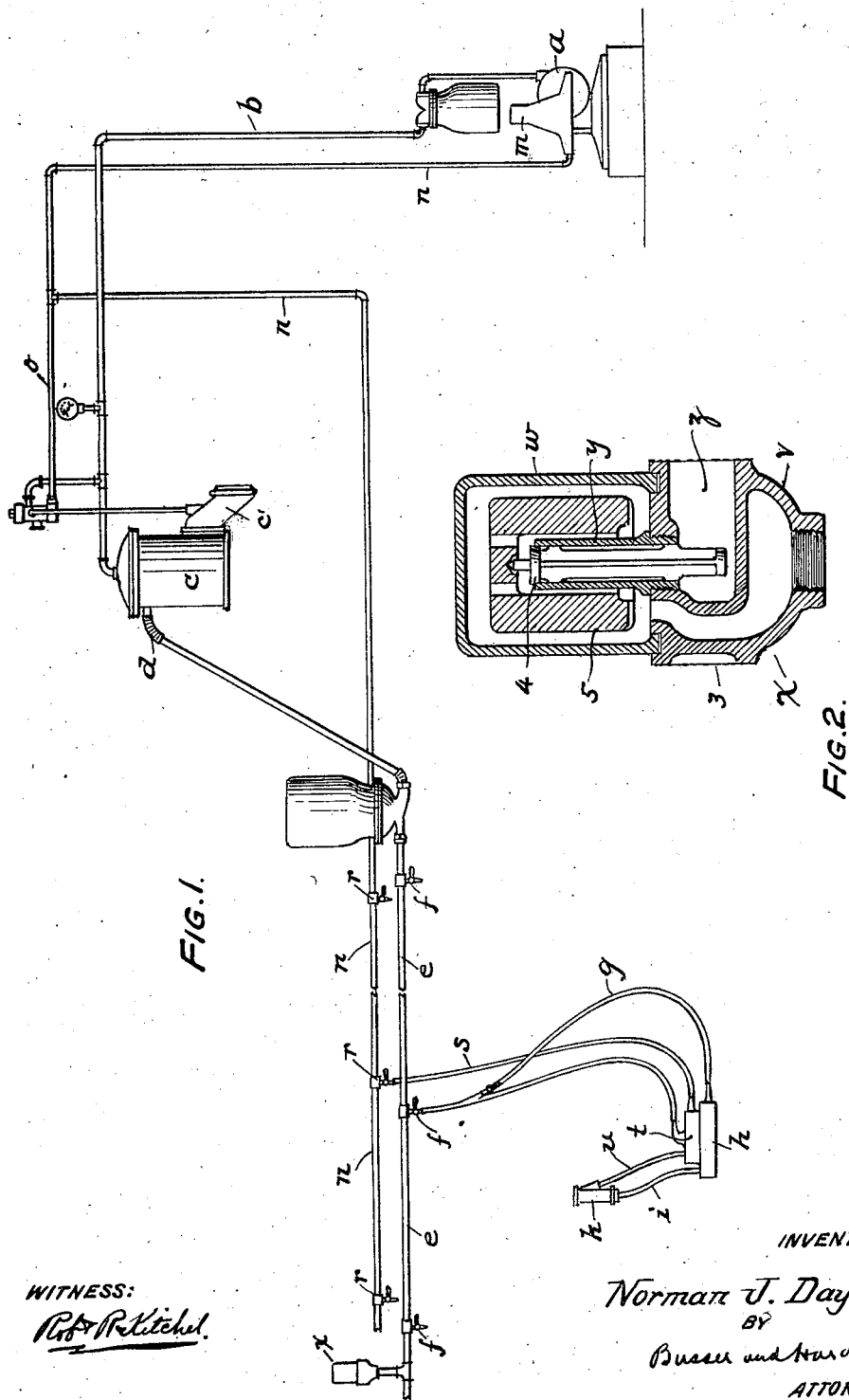

1,548,827

UNITED STATES PATENT OFFICE.

NORMAN J. DAYSH, OF NEW YORK, N. Y., ASSIGNOR TO THE DE LAVAL SEPARATOR COMPANY, OF NEW YORK, N. Y., A CORPORATION OF NEW JERSEY.

MILKING MACHINE.

Application filed April 4, 1924. Serial No. 704,109.

*To all whom it may concern:*

Be it known that I, NORMAN J. DAYSH, a subject of the King of Great Britain, residing at New York city, county of New York, and State of New York, have invented a new and useful Improvement in Milking Machines, of which the following is a full, clear, and exact description, reference being had to the accompanying drawings, which form a part of this specification.

A typical milking machine installation operating on the releaser system comprises a vacuum pump, a vacuum pipe line extending to a releaser, and a milk pipe line extending from the releaser through the cow barn and provided with cocks with any of which a connection may be made with a flexible tube extending from the milk chambers of a set of teat cups. It is known to operate the releaser by means of a valve (known as a pulso-relay) operable by pneumatic pulsations from a master pulsator operable by the vacuum pump. In a well known type of machine, these pneumatic pulsations are also transmitted through a pulsation pipe line extending through the barn, this second pipe line, like the first, being provided with cocks, with any of which a connection may be made with a flexible tube extending to an udder pulsator associated with the teat cups; this udder pulsator operating to connect alternately with atmosphere and suction, inflation chambers surrounding the milk chambers of the teat cups.

Whether there are two pipe lines (milk and pulsation) or but one (milk), it is important and necessary to provide a constant force of suction in the milk pipe line, so as to maintain at the teat cups about fifteen inches of vacuum. It is customary to control this vacuum by means of a control valve located in the vacuum pipe line between the pump and the releaser—usually close to the releaser.

It will be understood that a complete milking machine may comprise a relatively long milk pipe line provided with many cocks and adapted for a relatively large number of portable milking machine teat cup units; or the milk pipe may be short and adapted for a relatively small number of units. The customary number of units varies from two to ten. As the number of units increase, the vacuum at the pump must be increased. Hence, it is customary to provide a control valve having a weight or spring which is adjustable so that the vacuum may be high enough in the vacuum pipe to maintain a proper vacuum at the teat cups. The adjustment of the weight or spring must, of course, be varied in accordance with the number of units.

This method of vacuum control is open to serious objections. After the control valve is designed, it must be properly adjusted, which is not always done by the party making the installation. Moreover, the user is provided with a device which he or his hired help can and do adjust, with the result that the adjustment is very likely to be far from accurate, producing conditions at the teat cups which injure the cows or seriously interfere with the milking operation. The only alternative is to provide a special non-adjustable valve for each milking machine. This is impracticable from the manufacturer's standpoint.

I have discovered that if the control valve is located on the milk pipe and especially on the end of the milk pipe more remote from the releaser, and is adjusted so as to maintain in the adjacent milk pipe a predetermined degree of vacuum, the vacuum at the teat cups may be predetermined and will be substantially uniform whether the milk pipe be long or short or the units few or numerous. Therefore, it is possible to make a standard control valve which will not be adjustable by the user and which will maintain a proper vacuum at the teat cups regardless of the size of the installation.

The most desirable location for the standard fixed control valve is at or near the end of the milk pipe more remote from the releaser, although in certain installations it may be practicable to position the control valve more nearly toward the center of the milk pipe. Rarely, except perhaps in small installations can it be advantageously placed much nearer to the releaser than to the outer end. If placed near the releaser in a large installation, an adequate vacuum at the more remotely located units will not be insured.

In the drawings:

Fig. 1 is a diagram of a typical milking machine embodying my invention.

Fig. 2 is a sectional view of a practicable control valve.

From the vacuum pump $a$ extends a vacuum pipe $b$ to a releaser $c$. From the releaser c extends a milk pipe line d, e provided with any number of cocks f. To any of these cocks may be applied the milk tube g of a portable milker unit. The milk tube g connects with the milk chamber h carrying milk tubes i communicating with the teat chambers of the cups k. (For simplicity, but one teat cup is shown.)

In the milking machine shown, the releaser is operated by a valve (the so-called pulso-relay) to connect the discharge chamber c' of the relay alternately with the atmosphere and with the vacuum pipe b. To operate the relay, a master pulsator m is actuated by the vacuum pump a to connect a pulsation pipe n alternately with the atmosphere and suction. The relay pulsator p is actuated by pulsations transmitted through a branch pulsation pipe o. The main pulsation pipe n extends through the barn parallel with the milk pipe e and is provided with cocks r, to any of which may be applied the pulsation tube s of a teat cup unit. The pipe s connects with an udder pulsator valve chamber t, which is connected, by tubes u, with the inflation chambers of the teat cups k.

The control valve x is positioned on the milk pipe, preferably near the end thereof remote from the releaser. A control valve of any known construction may be used, although, to effect the purpose of my invention, it should be made non-adjustable, thereby insuring that the machine will be properly installed and insuring also against its subsequent arrangement arising from unskillful adjustments by the user.

The control valve shown in Fig. 2 is one of those disclosed in the Hall Patent No. 1,420,035, dated June 20, 1922. The base v is connected with the milk pipe e, a passage therein affording communication between the milk pipe and a dome w. A tube y is secured to the base and extends into the dome. Through this tube and passage z in the base, communication is afforded between the interior of the dome and the atmosphere. 3 represents a screen or the like for filtering incoming air. A valve 4 is guided within the tube y. A bell-shaped weight 5 is supported on the valve 4, and normally holds the valve in position to close communication between the interior of the dome and the atmosphere. If the absolute pressure in the milk pipe e falls below a predetermined maximum, the pressure of atmospheric air beneath the head of the weighted valve 4 is sufficient to lift it and admit sufficient air to cause the pressure in the milk pipe to rise to the desired maximum.

Having now fully described my invention, what I claim and desire to protest by Letters Patent is:

1. In a milking machine, the combination with a vacuum pump, a releaser, a vacuum pipe between the pump and the releaser, and a milk pipe line beyond the releaser adapted for connection with teat cup units, of a non-adjustable control valve adapted to regulate the vacuum at the teat cups and positioned on the milk pipe line.

2. In a milking machine, the combination with a vacuum pump, a releaser, a vacuum pipe between the pump and the releaser, and a milk pipe line beyond the releaser adapted for connection with teat cup units, of a control valve adapted to regulate the vacuum at the teat cups and positioned on the milk pipe line relatively nearer the end thereof more remote from the releaser than the end thereof connected with the releaser 3. In a milking machine, the combination with a vacuum pump, a releaser, a vacuum pipe between the pump and the releaser, a milk pipe line beyond the releaser, and cocks along the milk pipe line each adapted for connection with teat cup units, of a control valve adapted to regulate the vacuum at the teat cups and positioned on the milk pipe line beyond the cock most remote from the releaser.

4. In a milking machine, the combination with a vacuum pump, a releaser, a vacuum pipe between the pump and the releaser, a milk pipe line beyond the releaser adapted for connection with teat cup units, a valve adapted to connect the discharge chamber of the releaser alternately with the atmosphere and with said vacuum pipe, and means controlled by the vacuum pump to operate said valve, of a control valve adapted to regulate the vacuum at the teat cups and positioned on the milk pipe line.

In testimony of which invention, I have hereunto set my hand, at New York, N. Y., on this 15th day of March, 1924.

NORMAN J. DAYSH.

Witnesses:
   GEO. D. TALLMAN,
   JOHN G. PAUL.